United States Patent [19]
Kure et al.

[11] Patent Number: 5,528,889
[45] Date of Patent: Jun. 25, 1996

[54] RIDING LAWN TRACTOR

[75] Inventors: Masaji Kure; Kazuo Samejima, both of Sakai, Japan

[73] Assignee: Kubota Corporation, Japan

[21] Appl. No.: 412,984

[22] Filed: Mar. 28, 1995

[30] Foreign Application Priority Data

Nov. 9, 1994 [JP] Japan ........................... 6-274663

[51] Int. Cl.⁶ ............................................. A01D 34/64
[52] U.S. Cl. ..................... 56/15.6; 56/15.8; 56/DIG. 14
[58] Field of Search .................................. 56/15.8, 15.6, 56/15.7, 16.3, DIG. 14, DIG. 22

[56] References Cited

U.S. PATENT DOCUMENTS

| | | | |
|---|---|---|---|
| 3,706,186 | 12/1972 | Hurlburt et al. | 56/16.3 X |
| 3,795,094 | 3/1974 | Mollen et al. | 56/16.3 X |
| 3,948,025 | 4/1976 | Erdman | 56/15.6 X |
| 4,817,728 | 4/1989 | Schmid et al. | 56/15.6 X |
| 5,025,617 | 6/1991 | Kuhn et al. | 56/15.6 |

FOREIGN PATENT DOCUMENTS 6253641  9/1994  Japan .................. A01D 34/64

*Primary Examiner*—Terry Lee Melius
*Attorney, Agent, or Firm*—Webb Ziesenheim Bruening Logsdon Orkin & Hanson

[57] ABSTRACT

A coupling mechanism for connecting a working unit to a tractor body is disclosed which includes an engaging device and receiver brackets for coupling the working unit which is suspended from a lawn tractor body to links extending from the tractor body. The engaging device includes a first rod extending transversely from the links, a second cross rod spaced and parallel to the first cross rod, and a connecting device interconnecting the cross rods. Each receiver bracket includes a receiving groove for simultaneously receiving part of the first and second cross rods therein. The receiving groove includes a first groove portion having a length corresponding to a distance between the two cross rods, a second groove portion extending from the first groove portion in a direction substantially perpendicular thereto, and an opening to the exterior of the bracket. With this construction, the engaging device is not readily separable from the receiver brackets when the lawn tractor moves forward or backward. For disengagement, the second cross rod is slid through the second groove portion and out of each receiver bracket, then the first cross rod is slipped through the first and second groove portions and out of the receiver bracket.

14 Claims, 5 Drawing Sheets

1

RIDING LAWN TRACTOR

BACKGROUND OF THE INVENTION

1. Field of the Invention

The present invention relates to a riding lawn tractor in which a mower unit may be coupled to a tractor body through front and rear links. More particularly, the invention relates to a coupling mechanism between the mower unit and the front links connected to the tractor body.

2. Description of the Prior Art

A connection between a mower unit and front links connected to a tractor body in a conventional riding lawn tractor is disclosed in Japanese Patent Publication Kokai No. 6-253641, for example. This connection includes a headed pin extending through bores formed in rear end regions of the front links, and through mating bores formed in a bracket fixed to the front of a blade housing of the mower unit. The headed pin defines bores in the head and an opposite end region, and retainer pins or the like are passed through the bores to retain the headed pin in place. To detach the mower unit from the tractor body, the retainer pins are removed, and then the headed pin is slid transversely of the tractor body out of the bores of the front links and the bracket of the mower unit.

The connection between the front links and the bracket of the mower unit is situated in a confined space under the tractor body. It is a troublesome operation to attach or detach the right and left retainer pins and the connecting pin. This lowers operating efficiency in coupling and uncoupling the mower unit and front links.

SUMMARY OF THE INVENTION

The object of the present invention is to provide a coupling structure between coupling links and a bracket on a mower unit, which facilitates operations to couple and uncouple a tractor body and the mower unit, and in which front links do not easily or inadvertently come off once the links are coupled.

The above object is fulfilled, according to the present invention, by a coupling mechanism comprising:

an engaging device including:
- a first cross rod extending parallel to a transverse shaft of the tractor body;
- a second cross rod spaced from the first cross rod and extending substantially parallel to the first cross rod; and
- a connecting device for interconnecting the first cross rod and the second cross rod; and receiver brackets each defining a groove for simultaneously receiving part of the first cross rod and part of the second cross rod, the groove including a first groove portion having a length substantially corresponding a distance between the first cross rod and the second cross rod, and a second groove portion extending from the first groove portion in a direction substantially perpendicular thereto and opening to ambient.

According to the above construction, in a coupled state, front links are engaged with the receiver brackets through the first and second cross rods. When the tractor moves forward, the front links haul a working unit through the contact between the first cross rod and the first groove portion of each receiver bracket. When the tractor moves backward, the front links push the working unit backward which would otherwise stand still in contact with the ground. At this time, the working unit is driven backward, with the second cross rod contacting walls of the first groove portions, thereby preventing the front links from shifting backward out of the receiver brackets.

For disengaging the front links from the receiver brackets, forward ends of the front links are detached from the tractor body first. Then, the second cross rod is moved along the second groove portion of each receiver bracket and out of the bracket. Subsequently, the first cross rod remaining in the groove is removed from the first groove portion and then from the second groove portion. Thus, the engaging device, i.e. the first and second cross rods, may be removed from the receiver brackets with ease.

Consequently, instead of employing a complicated coupling device having a pin to be moved transversely through bores formed in two components, an engaging or disengaging operation is carried out simply by dropping the two cross rods into the grooves or picking up the rods therefrom. This construction is also effective to prevent the links from inadvertently becoming disengaged as a result of movement of the tractor body.

Other features and advantages of the present invention will be apparent from the following description.

DETAILED DESCRIPTION OF THE PREFERRED EMBODIMENTS

Figure 1:
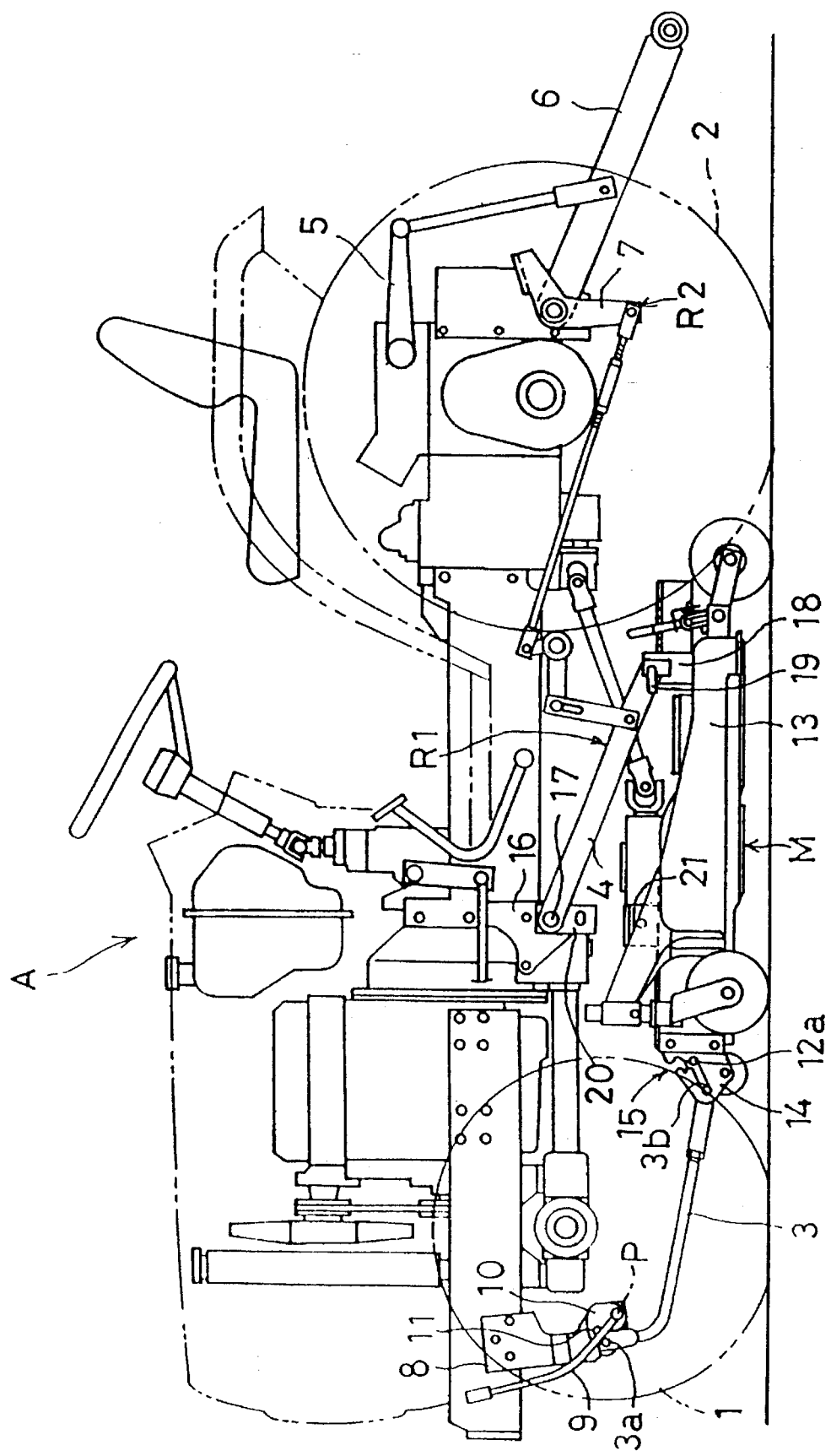
FIG. 1 is a side elevation of a riding lawn tractor according to the present invention.

FIG. 1 shows a mid-mount type riding lawn tractor having a mower unit M disposed in a space under a tractor body A between front wheels 1 and rear wheels 2. The mower unit M is vertically movably connected to the tractor body A through a parallelogram link mechanism R1 including front links 3 and rear links 4. When lift arms 5 are operated to cause lower links 6 to pivot vertically, contact links 7 constituting a link mechanism R2 pivot through contact with upper surfaces of the lower links 6, thereby moving the mower unit M vertically.

Figure 5:
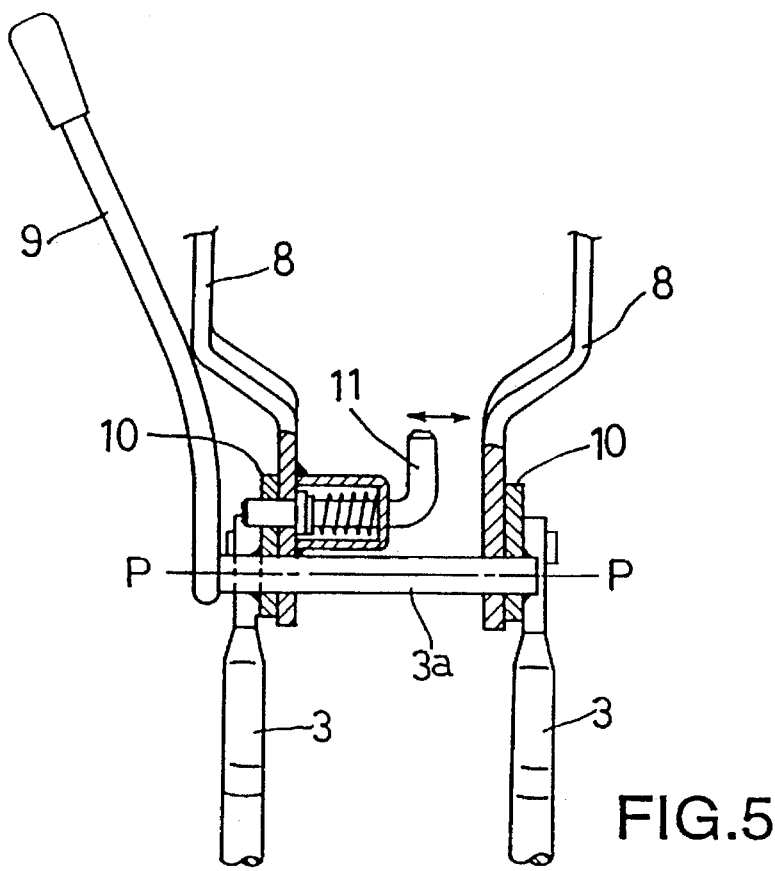
FIG. 5 is a plan view, partly in section, showing a coupling mechanism between a tractor body and forward ends of front links.

The tractor body A has brackets 8 extending downward and supporting a pivotable hook 10. The front links 3 are locked to and unlocked from the brackets 8 through pivotal movement of the hook 10. A lever 9 is fixed to the hook 10 for pivoting the hook 10. The hook 10 may be retained by a lock pin 11 in a position for locking the front links 3. As shown in FIG. 5, the lock pin 11 has a handle, is slidable transversely relative to the brackets 8, and is spring-loaded toward a locking position.

Figure 2:
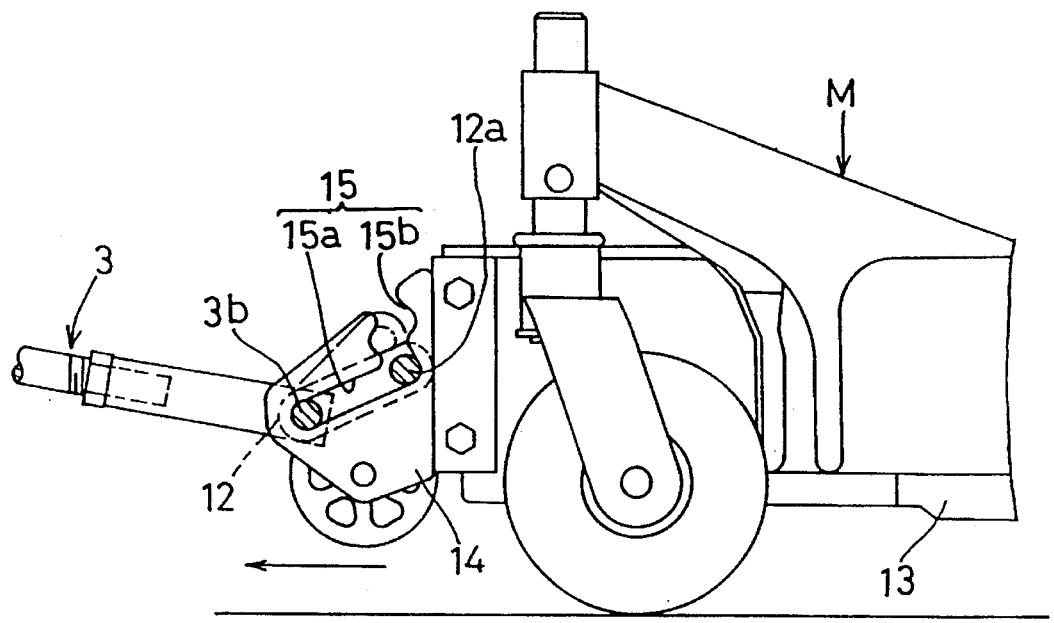
FIG. 2 is a side view showing a front link and a mower unit coupled to each other.
Figure 3:
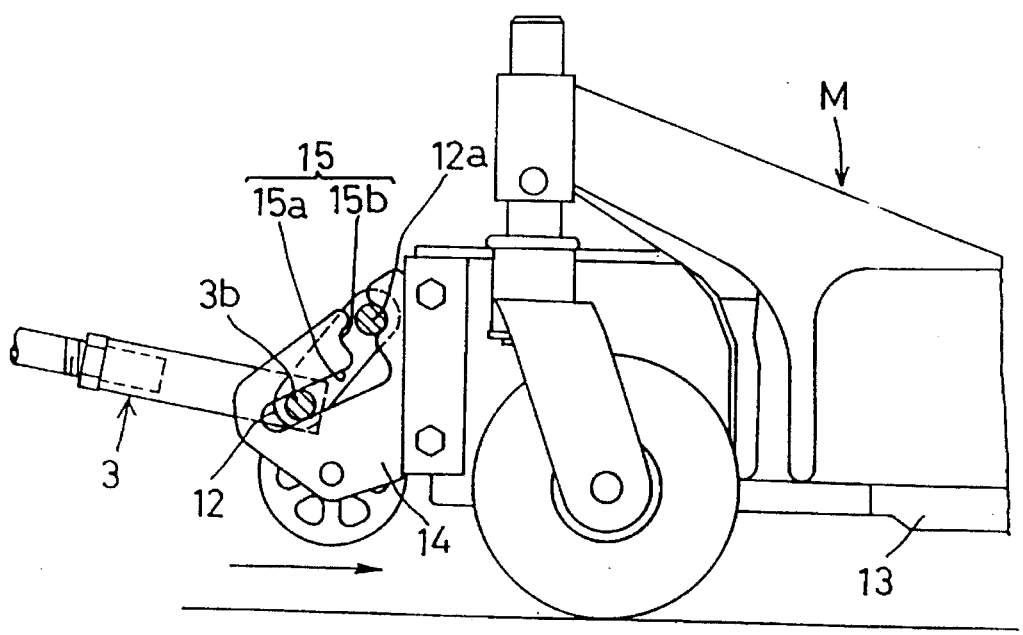
FIG. 3 is a side view similar to FIG. 2 and showing a second cross rod of an engaging device engaging a second groove portion.

The front links 3, which are a pair of right and left front links, have forward ends thereof interconnected through a transverse rod 3a, and rear ends interconnected through a first cross rod 3b. A pair of right and left coupling plates 12 are pivotally connected to the first cross rod 3b. Free ends of the coupling plates 12 are interconnected through a second cross rod 12a. As shown in FIG. 2, the mower unit M includes a blade housing 13 having mounting brackets 14 attached to the front thereof. Each mounting bracket 14 defines an engaging groove 15 for receiving and engaging the first and second cross rods 3b and 12a. The engaging groove 15 has an opening directed upwardly and forwardly. The engaging groove 15 includes a second groove portion 15b defining a zigzag passage extending from the opening. The engaging groove 15 is substantially L-shaped as a whole when seen from a side of the tractor body A. That is, the second groove portion 15b extends substantially downwardly and rearwardly, and is then curved in a predetermined position. A first groove portion 15a extends downwardly and forwardly from the curved position to a closed end. The first groove portion 15a has a length substantially corresponding to a length formed by the first cross rod 3b and second cross rod 12a interconnected by the pair of coupling plates 12.

As shown in FIG. 1, the rear links 4 also comprise a pair of right and left links. Each rear link 4 has a forward end thereof pivotally connected to a bracket 16 on the tractor body A through a coupling pin 17, and a rear end connected to a link attaching bracket 18 in a rearward position of the mower unit M through a lock pin 19 slidable transversely of the tractor body A. The lock pin 19 has a handle for sliding it transversely of the tractor body A, to lock and unlock the rear link 4. The lock pin 19 is spring-loaded toward a locking position.

To detach the mower unit M from the tractor body A, the forward ends of the front links 3 are first disengaged from the tractor body A. Then, the rear ends of the front links 3 are disengaged from the mower unit M. Subsequently, the rear ends of the rear links 4 are uncoupled from the mower unit M.

Figure 4:
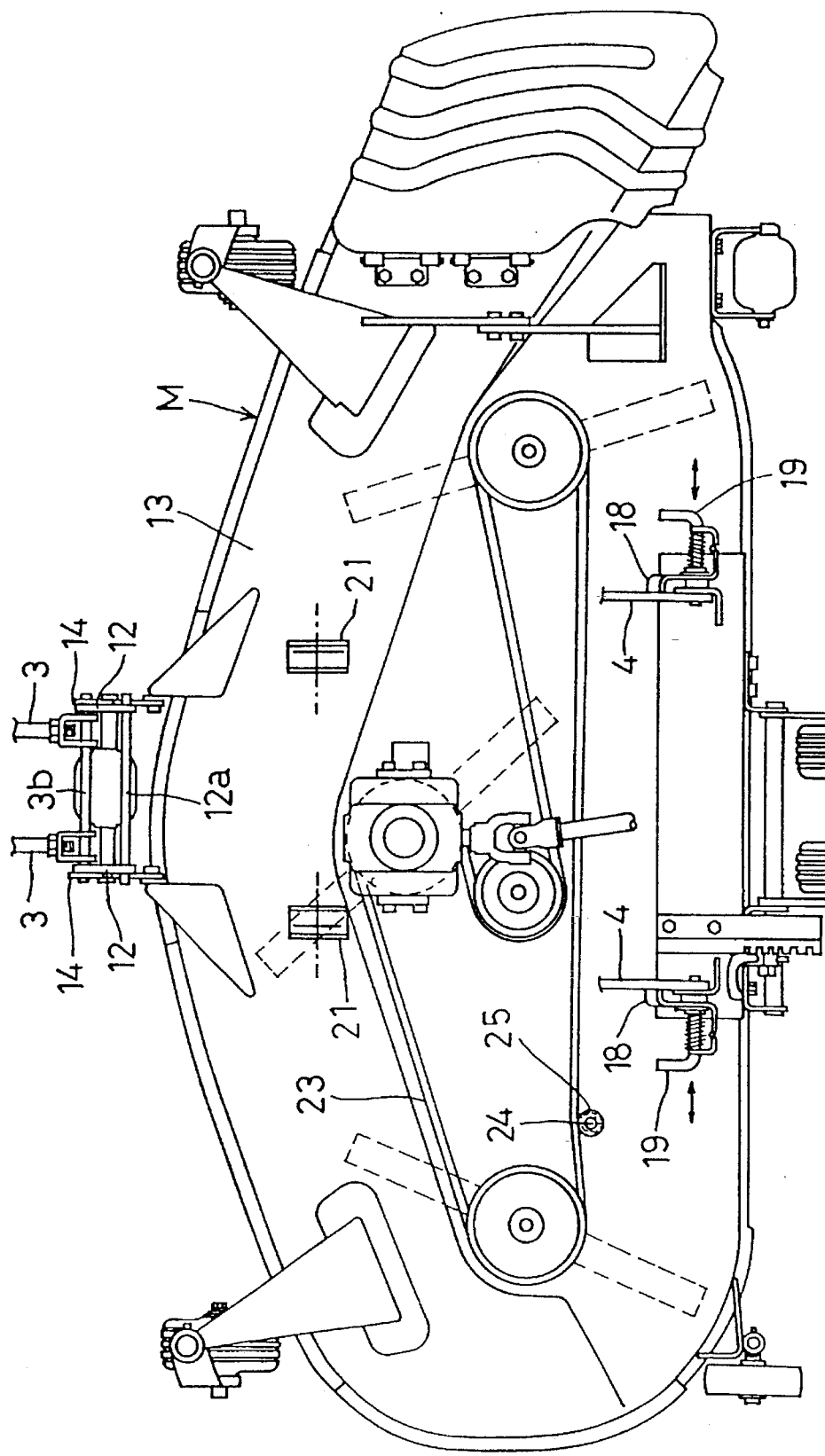
FIG. 4 is a plan view of the mower unit and coupling mechanism.
Figure 6:
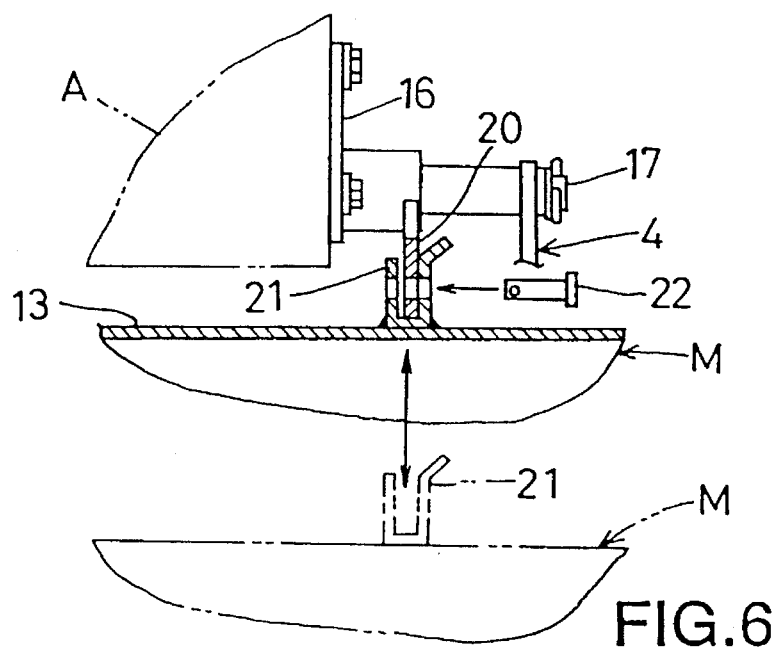
FIG. 6 is a front view, partly in section, showing a structure for fixing the mower unit in an upper limit position to the tractor body, the mower unit in a lower position being shown in so-dot-and-dash lines.

As shown in FIGS. 1, 4 and 6, the mower unit M includes anti-chatter devices 21 mounted on an upper surface of the blade housing 13 of the mower unit M. When the mower unit M is raised to an upper limit position, plates 20 attached to the tractor body A are press fit in the anti-chatter devices 21. This absorbs transverse play occurring in connections between the front and rear links 3 and 4 and the brackets 8 and 16. Each of the anti-chatter devices 21 is in the form of a U-shaped metal element. An upper end region of the outer portion of the U-shaped metal element is bent sideways. In the course of upward movement of the mower unit M, the plate 20 on the tractor body A contacts the bent upper end region. With a further upward movement of the mower unit M, the plate 20 is guided by the bent region to enter the U-shaped metal element acting as the anti-chatter device 21. The pair of plates 20 have a predetermined distance therebetween so that each plate 20 is in pressure contact with the outer portion of the anti-chatter device 21 leaving no space in between. A pin 22 is used to interconnect each plate 20 and anti-chatter device 21 in pressure contact with each other. Thus, longitudinal and transverse chattering between the tractor body A and the mower unit M in the upper limit position is avoided.

As shown in FIG. 4, a blade driving belt 23 is in contact with a belt presser pin 24. A sound proofing cover 25 is mounted peripherally of this pin 24 to suppress contact noise.

The second cross rod 12a may extend laterally outwardly of one of the coupling plates 12 to be used as a handle.

Figure 7:
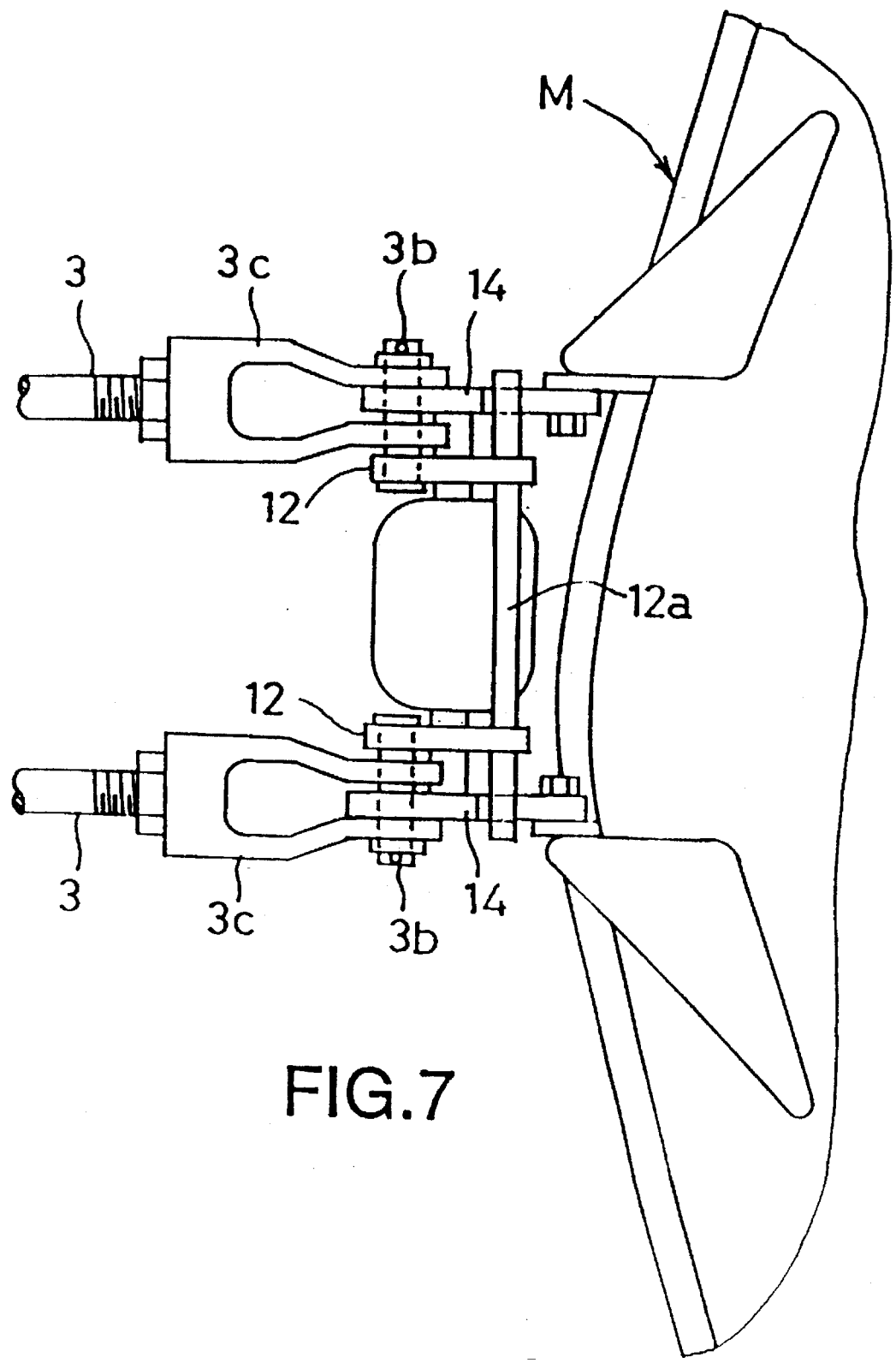
FIG. 7 is a fragmentary plan view showing front links and a mower unit coupled to each other according to another embodiment of the invention.

The front links 3 may have modified engaging devices as shown in FIG. 7. In this example, the rear ends of front links 3 are not directly interconnected, but include bifurcate elements 3c extending therefrom, respectively. Each bifurcate element 3c has bores formed in free end regions thereof for rotatably receiving a rod 3b. A coupling plate 12 extends from an inward end of each rod 3b. The coupling plates 12 are interconnected at free ends thereof by a cross rod 12a. For coupling the engaging device to the brackets 14, a portion of each rod 3b between the two prongs of the bifurcate element 3c and each end of the cross rod 12a may be fitted into the first groove portion 15a.

What is claimed is:

1. A coupling mechanism for coupling a working unit to links extending from a lawn tractor body, comprising:
   engaging means attached to said links and including:
      a first cross rod extending from said links parallel to a transverse shaft of said tractor body;
      a second cross rod spaced from said first cross rod and extending substantially parallel to said first cross rod; and
      connecting means for interconnecting said first cross rod and said second cross rod;
      said connecting means and said second cross rod being pivotable relative to said links about an axis adjacent said first cross rod; and brackets mounted on said working unit, each said brackets including:
      a first groove portion extending substantially longitudinally of said links for simultaneously receiving part of said first cross rod and part of said second cross rod, said first groove portion having a length substantially corresponding a distance between said first cross rod and said second cross rod; and
      a second groove portion extending from said first groove portion in a direction substantially perpendicular thereto and opening to ambient.

2. A coupling mechanism as defined in claim 1, wherein said connecting groove extends forwardly and upwardly with respect to said tractor body from a position adjacent said rear limit wall.

3. A coupling mechanism as defined in claim 2, wherein said connecting groove extends zigzag.

4. A coupling mechanism for coupling a working unit suspended from a lawn tractor body to links extending from said tractor body, comprising:
   engaging means including:
      a first cross rod extending from said links parallel to a transverse shaft of said tractor body;
      a second cross rod spaced from said first cross rod and extending substantially parallel to said first cross rod; and
      connecting means for interconnecting said first cross rod and said second cross rod; and
   receiver brackets each defining a groove for simultaneously receiving part of said first cross rod and part of said second cross rod, each said groove including a first groove portion having a length substantially corresponding a distance between said first cross rod and said second cross rod, and a second groove portion extending from said first groove portion in a direction substantially perpendicular thereto and opening to ambient.

5. A coupling mechanism as defined in claim 1, wherein at least part of said second groove portion is curved.

6. A coupling mechanism as defined in claim 1, wherein said first cross rod is pivotably attached to free ends of said links, and said receiver brackets are attached to said working unit.

7. A coupling mechanism as defined in claim 6, wherein said second cross rod is inclined toward one of said links, with an opening directed upward, and said first cross rod is inclined to move downward toward one of said links with entry of said first cross rod.

8. A coupling mechanism as defined in claim 7, wherein said second cross rod extends zigzag.

9. A coupling mechanism as defined in claim 8, wherein said connecting means includes connecting plates for interconnecting said first cross rod and said second cross rod, each of said first and second first cross rods having opposite ends extending outwardly of said connecting plates to act as operative ends.

10. A tractor comprising:

a tractor body;

a working unit suspended from said tractor body;

a link mechanism suspending said working unit from said tractor body, said link mechanism including a pair of links and a coupling mechanism for coupling said working unit and said links, said coupling mechanism including:

at least one first cross rod extending from said links substantially perpendicular to said links, a second cross rod spaced from said first cross rod and positioned substantially parallel to said first cross rod, at least one connecting plate interconnecting said first cross rod and said second cross rod, and at least one receiver bracket coupled to said working unit, each said bracket defining a groove therein for simultaneously receiving part of said first cross rod and part of said second cross rod.

11. The tractor of claim 10 further including a second coupling mechanism for coupling said tractor body and said links, said second coupling mechanism including a transverse rod extending between said links and a pivotable hook secured to said tractor body and adapted to releaseably couple said links thereto by pivotable movement of said hook.

12. The tractor of claim 10 further including anti-chatter devices mounted on an upper portion of said working unit.

13. The tractor of claim 12 wherein said anti-chatter devices are generally U-shaped elements and further including anti-chatter plates secured to said tractor body and adapted to be press fit into said U-shaped anti-chatter devices with said working unit raised to an upper position.

14. The tractor of claim 10 wherein each said link includes a bifurcate end with a bore therethrough for rotatably receiving one said first cross rod therethrough.

* * * * *

UNITED STATES PATENT AND TRADEMARK OFFICE
CERTIFICATE OF CORRECTION

PATENT NO. : 5,528,889
DATED : June 25, 1996
INVENTOR(S) : Masaji Kure and Kazuo Samejima It is certified that error appears in the above-indentified patent and that said Letters Patent is hereby corrected as shown below:

```
Claim 9 Line 17 Column 5 "first and second first cross
    rods" should read --first and second cross rods--.
```

Signed and Sealed this

Eighteenth Day of February, 1997

Attest:

BRUCE LEHMAN

*Attesting Officer*  *Commissioner of Patents and Trademarks*